(12) United States Patent
Kamavaram et al.

(10) Patent No.: US 11,639,456 B1
(45) Date of Patent: May 2, 2023

(54) THERMALLY CONDUCTIVE MATERIALS AND TUBING, AND APPLICATIONS THEREOF

(71) Applicant: Oceanit Laboratories, Inc., Honolulu, HI (US)

(72) Inventors: Venkat Kamavaram, Honolulu, HI (US); Ravi Pare, Kailua, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 103 days.

(21) Appl. No.: 17/146,442

(22) Filed: Jan. 11, 2021

Related U.S. Application Data (60) Provisional application No. 62/959,802, filed on Jan. 10, 2020.

(51) Int. Cl.
| | | |
|---|---|---|
| *C09K 5/14* | (2006.01) | |
| *C08F 118/08* | (2006.01) | |
| *C08K 7/06* | (2006.01) | |
| *C08K 3/04* | (2006.01) | |
| *C08K 3/38* | (2006.01) | |
| *C08K 3/22* | (2006.01) | |
| *C08K 5/11* | (2006.01) | |
| *C08K 13/04* | (2006.01) | |
| *C08J 5/18* | (2006.01) | |
| *C08L 23/08* | (2006.01) | |
| *C08L 31/04* | (2006.01) | |
| *C08J 3/20* | (2006.01) | |
| *C08F 110/02* | (2006.01) | |

(52) U.S. Cl.
CPC .............. *C09K 5/14* (2013.01); *C08F 110/02* (2013.01); *C08F 118/08* (2013.01); *C08J 3/203* (2013.01); *C08J 5/18* (2013.01); *C08K 3/04* (2013.01); *C08K 3/041* (2017.05); *C08K 3/042* (2017.05); *C08K 3/22* (2013.01); *C08K 3/38* (2013.01); *C08K 5/11* (2013.01); *C08K 7/06* (2013.01); *C08K 13/04* (2013.01); *C08L 23/0853* (2013.01); *C08L 31/04* (2013.01); *C08J 2323/08* (2013.01); *C08J 2331/04* (2013.01); *C08K 2003/2296* (2013.01); *C08K 2003/385* (2013.01); *C08K 2201/001* (2013.01); *C08K 2201/011* (2013.01); *C08K 2201/014* (2013.01); *C08L 2203/16* (2013.01); *C08L 2205/06* (2013.01)

(58) Field of Classification Search
CPC .. C08L 23/0853; C08L 31/04; C08L 2203/16; C08L 2205/06; C09K 5/14; C08J 3/203; C08J 5/18; C08J 2323/08; C08J 2331/04; C08F 110/02; C08F 118/08; C08K 3/041; C08K 3/042; C08K 3/04; C08K 3/22; C08K 3/38; C08K 5/11; C08K 7/06; C08K 13/04; C08K 2003/2296; C08K 2003/385; C08K 2201/001; C08K 2201/011; C08K 2201/014
See application file for complete search history.

(56) References Cited

U.S. PATENT DOCUMENTS

| | | | | |
|---|---|---|---|---|
| 2,220,190 | A * | 11/1940 | Wolf ...................... | B65D 25/04 |
| | | | | 220/531 |
| 5,502,095 | A * | 3/1996 | Ueshima ................. | C08L 67/02 |
| | | | | 524/269 |
| 7,291,381 | B2 * | 11/2007 | Tobita ...................... | C08K 7/06 |
| | | | | 264/437 |
| 9,117,568 | B2 * | 8/2015 | Scheffer ................... | C09D 7/61 |
| 2005/0209403 | A1 * | 9/2005 | Walton .................... | C08L 23/08 |
| | | | | 525/194 |
| 2005/0256265 | A1 * | 11/2005 | Wright .................... | C08L 53/02 |
| | | | | 525/88 |
| 2006/0199887 | A1 * | 9/2006 | Liang ...................... | C08K 3/013 |
| | | | | 524/451 |
| 2008/0194736 | A1 * | 8/2008 | Lu .............................. | C08J 3/20 |
| | | | | 524/451 |
| 2012/0121842 | A1 * | 5/2012 | Hoshino ................. | B32B 27/20 |
| | | | | 524/424 |
| 2016/0374411 | A1 * | 12/2016 | Brooks ................... | A61F 7/007 |
| | | | | 165/104.21 |
| 2019/0367712 | A1 * | 12/2019 | Bento ...................... | C08L 23/12 |

* cited by examiner

*Primary Examiner* — Jane L Stanley
(74) *Attorney, Agent, or Firm* — Fresh IP PLC; Clifford D. Hyra; Aubrey Y Chen (57) ABSTRACT

The present invention relates to thermally conductive materials, including, for instance, thermally conductive tubing and thermally conductive apparel, and applications thereof. In particular, the invention relates to thermally conductive tubing that can used in thermoregulatory apparel, such as, for example, cooling garments and cooling vests. In at least one embodiment, the present invention includes a thermally conductive material made from one or more base polymers and one or more additives that increase the thermal conductivity of the thermally conductive material relative to the one or more base polymers. The base polymer may include, for example, ethylene vinyl acetate (EVA), and the additive may include, for example, graphite fibers. The thermally conductive material may also include, for instance, a secondary polymer, such as ethylene propylene diene monomer (EPDM) and/or a plasticizer, such as bis(2-ethylhexyl) adipate (DEHA). Thermally conductive material produced according to one or more embodiments of the present invention may also be extruded or formed to create thermally conductive tubing and/or sheets.

23 Claims, 6 Drawing Sheets

THERMALLY CONDUCTIVE MATERIALS AND TUBING, AND APPLICATIONS THEREOF

CROSS-REFERENCE TO RELATED APPLICATIONS

This application claims the benefit of U.S. Provisional Application No. 62/959,802, filed Jan. 10, 2020, which is incorporated by reference herein in its entirety.

The invention described herein was made with U.S. government ("Government") support under Contract No. W911QY-17-C-0031, awarded by the U.S. Army and the Army Soldier Systems Center). As a result, the Government has certain rights in this invention.

FIELD OF THE INVENTION

The disclosure relates generally to thermally conductive materials, including, for instance, thermally conductive tubing and thermally conductive apparel, and applications thereof. In particular, the disclosure relates to thermally conductive tubing that can used in thermoregulatory apparel, such as, for example, cooling garments and cooling vests.

BACKGROUND

Thermally conductive materials are desirable, and even necessary, for a wide range of functions and use scenarios in order to provide thermoregulation. For instance, thermally conductive materials can be used in wearable apparel, including, for example, cooling vests, cooling and/or heating pads, and the like, to provide effective thermoregulation for the user.

Generally, metals are the best conductors of heat. However, metals are often stiff and hard, making them unsuitable for many heat transfer or thermoregulatory applications that require mechanical flexibility. As a result, composite materials with both thermal conductivity and flexibility are needed for such applications. Such composites may include, for example, polymer composites and thermally conductive elastomers, including, for instance, the Coolpoly Elastomers, sold by Celanese Corporation (https://www.celanese.com/engineered-materials/products/CoolPoly-TCP/coolpoly-elastomers.aspx). However, most polymers are thermally non-conductive, except for conjugate polymers, which are often expensive and cost prohibitive.

Although several researchers report polymer composites with very high thermal conductivity, these materials either have physical properties that make them incompatible with many use scenarios, including wearable apparel, or are unavailable commercially.

Given the foregoing, there exists a significant need for thermally conductive material that is both thermally conductive and flexible enough for use in a variety of applications, including use in wearable apparel.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In general, the present invention is directed in embodiments to thermally conductive materials, including, for instance, thermally conductive tubing and thermally conductive apparel, and applications thereof. In particular, embodiments of the invention relate to thermally conductive tubing that can be used in thermoregulatory apparel, such as, for example, cooling garments and cooling vests.

In at least one embodiment of the present invention, a thermally conductive material comprises one or more base polymers and one or more additives that increase thermal conductivity relative to the one or more base polymers. Such additives can include, for example, metal or ceramic additives. Non-limiting examples of such additives include, for instance, graphite fibers. Accordingly, in at least one embodiment, the thermally conductive material comprises a base polymer comprising either ethylene vinyl acetate (EVA) or ethylene methyl acetate (EMA), and at least 8% by weight graphite fibers. The concentration of graphite fibers may be 8% to 40% by weight, and, in particularly preferred embodiments, 8%, 12%, or 20%. In specific embodiments, the base polymer is EVA and the graphite fibers have a concentration by weight of either 8% or 12%. The material of such embodiments has a hardness of 60 to 70 Shore A, a tensile stress of 1570 to 1660 psi, an elongation ($\varepsilon_M$) of 200% to 230%, a break stress of 1410 to 1530 psi, and a thermal conductivity of 0.3 W/mK to 0.4 W/mK.

One or more embodiments of the present invention further comprise a thermally conductive material having a secondary polymer and/or a plasticizer, either or both of which serve to reduce hardness of the thermally conductive material and/or to increase thermal conductivity of the thermally conductive material relative to thermal conductivity of the one or more base polymers. The secondary polymer may have a lower hardness than the one or more base polymers and may include, for instance, ethylene propylene diene monomer (EPDM), and the plasticizer may include, for example, bis(2-ethylhexyl) adipate (DEHA). Accordingly, in at least one embodiment, the thermally conductive material comprises a base polymer that is 70% by weight EMA, 15% by weight graphite fibers, and 15% by weight DEHA. Such a material may have a hardness of 60 to 62 Shore A and a thermal conductivity of approximately 0.3 W/mK. In a further embodiment, the thermally conductive material comprises a base polymer that is 65% by weight EVA, 15% by weight graphite fibers, 15% by weight DEHA, and 5% by weight EPDM. In still further embodiments, the thermally conductive material comprises a base polymer that is 70% by weight EVA, 15% by weight graphite fibers, and 15% by weight DEHA. Such a material may have a hardness of approximately 75 Shore A and a thermal conductivity of approximately 0.3 W/mK.

In additional embodiments, the thermally conductive material comprises one or more base polymers, one or more additives, a secondary polymer, and a plasticizer, wherein the one or more base polymers comprises 65% to 70% by weight of EVA or EMA, wherein the one or more additives comprises 12% to 15% by weight of graphite fibers, wherein the secondary polymer comprises 0% to 5% by weight of EPDM, and wherein the plasticizer comprises 15% DEHA.

Further embodiments of the invention comprise a thermally conductive tube and/or a thermally conductive sheet comprising one or more of the thermally conductive materials recited above. In additional embodiments, a method of manufacturing such thermally conductive tubes and/or thermally conductive sheets comprises extruding one or more of the thermally conductive materials recited above into a thermally conductive tube and/or a thermally conductive sheet.

It should be appreciated that one or more of the base polymers may comprise at least one polymer resin matrix, and that the base polymer may be selected from the group consisting of: EVA, EMA, Room-Temperature-Vulcanizing (RTV) silicone, and combinations thereof.

Additionally, in some embodiments, the one or more additives is selected from the group consisting of: graphite fibers, boron nitride, zinc oxide (ZnO), multi-walled carbon nanotubes (MWCNT), graphene, and combinations thereof.

A method for producing a thermally conductive material is also disclosed herein. The method may comprise combining one or more base polymers with one or more additives, thereby producing a composite material, wherein the one or more additives increases thermal conductivity of the composite material relative to the one or more base polymers; and adding a secondary polymer and/or a plasticizer to the composite material, thereby producing the thermally conductive material. In some embodiments, the combining step may be performed using a twin screw-extruder compounding machine. In further embodiments, the aforementioned method may further comprise producing a plurality of thermally conductive tubes from the thermally conductive material; and/or producing a plurality of thermally conductive sheets from the thermally conductive material. It should be appreciated that the thermally conductive material produced by the method may be one or more of the thermally conductive materials mentioned above herein.

A method for using a thermally conductive material is also disclosed herein. The method comprises utilizing thermally conductive material in a wearable thermoregulatory system. The thermally conductive material may be one or more of the thermally conductive materials recited above, and the wearable thermoregulatory system may be, for instance, a piece of wearable apparel such as, e.g., a cooling vest.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

DETAILED DESCRIPTION

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Generally, the present invention is directed towards thermally conductive materials, including, as non-limiting examples, thermally conductive tubing and thermally conductive apparel. In particular, the invention relates to thermally conductive tubing that can be utilized in a wearable garment designed to manage the wearer's body heat, such as a cooling vest. Such tubing can be used in a variety of applications, including, for example, heat extraction systems, thermal management applications, and heat sinks.

One or more embodiments of the present invention comprise thermally conductive material formed from a combination of a base polymer and at least one additive that increases the thermal conductivity of the base polymer. The at least one additive may comprise, as non-limiting examples, metallic or ceramic additives. In addition to thermal conductivity, other properties of the at least one additive may be important, including physical properties such as, for instance, mechanical strength, flexibility, and hardness. Hardness of the thermally conductive material should preferably be between 60-70 Shore A, while the material's mechanical strength/stress should preferably be between 1500-1700 psi, and the material's elongation at break should preferably be between 200-260%. It should be appreciated that these physical properties of the thermally conductive material depend, at least in part, upon the specific additive and the specific base polymer chosen to be combined with each other, as well as the amount and composition of both the additive and the polymer.

Table 1 below shows a list of exemplary base polymers that can be used to manufacture thermally conductive materials.

TABLE 1

Exemplary polymers for use in manufacturing thermally conductive materials.

| Material | Type |
| --- | --- |
| EVA—Ethylene Vinyl Acetate | Polymer Resin Matrix |
| EMA—Ethylene Methyl Acrylate | Polymer Resin Matrix |
| EPDM—Ethylene Propylene Diene Monomer | Secondary polymer |

TABLE 1-continued

Exemplary polymers for use in manufacturing thermally conductive materials.

| Material | Type |
| --- | --- |
| Silicone RTV | Polymer Resin Matrix |
| DEHA - Bis(2-ethylhexyl) adipate | Plasticizer |

Similarly, Table 2 below shows a list of exemplary additives capable of increasing the thermal conductivity of one or more base polymers. The thermal conductivity of each of these exemplary additives is also listed.

TABLE 2

Exemplary additives for use in manufacturing thermally conductive materials.

| Material | Thermal Conductivity (W/mK) |
| --- | --- |
| Graphite Fibers | 900 |
| Boron Nitride | 1055 |
| ZnO | 50 |
| Multi-walled carbon nanotubes | ~3000-3500 |
| Graphene | 3846 |

In at least one embodiment of the present invention, one or more base polymers are compounded with one or more additives to produce a thermally conductive material. Such compounding may be achieved via, for example, a twin screw-extruder compounding machine or any other method or apparatus well-known in the art. It should be appreciated that the aforementioned thermally conductive material is composite in nature.

It should further be appreciated that the overall thermal conductivity of the composite material depends on the composition of both the one or more base polymers and the one or more additives (which may be expressed experimentally by plotting the relationship between composition and conductivity), as well as the distribution of the additives in the base polymers in the resulting composite material. Internal distribution and homogeneity of the additive in the thermally conductive material may be tested through, for instance, microscopic analysis, mechanical testing, and the like.

Figure 1:
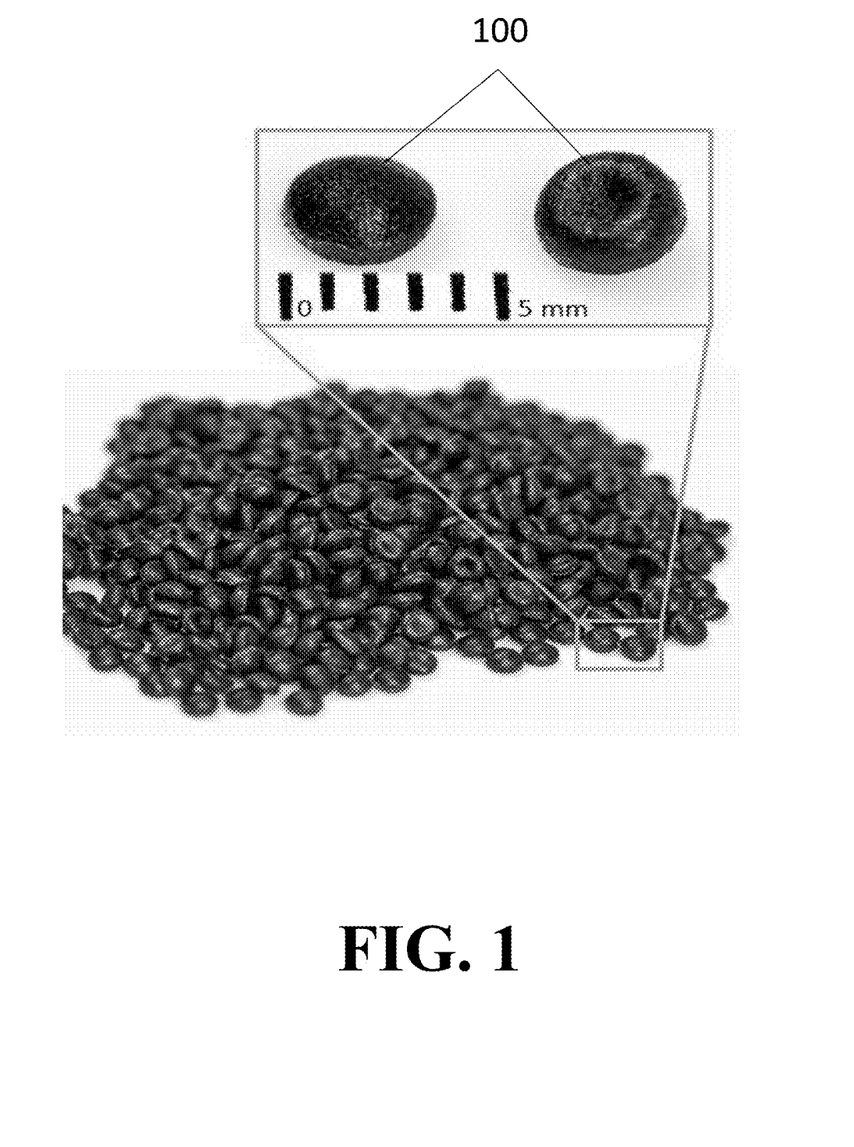
FIG. 1 is a depiction of an exemplary thermally conductive material in pellet form, according to at least one embodiment of the present invention.

An exemplary thermally conductive material is shown in FIG. 1. Each pellet of material 100 is approximately 3.5 mm. in diameter. One of skill in the art will appreciate that pellet size depends on the method of manufacturing the pellets, including, for example, the specific extrusion machine used and the mechanism used to slice the pellets.

Figure 2A:
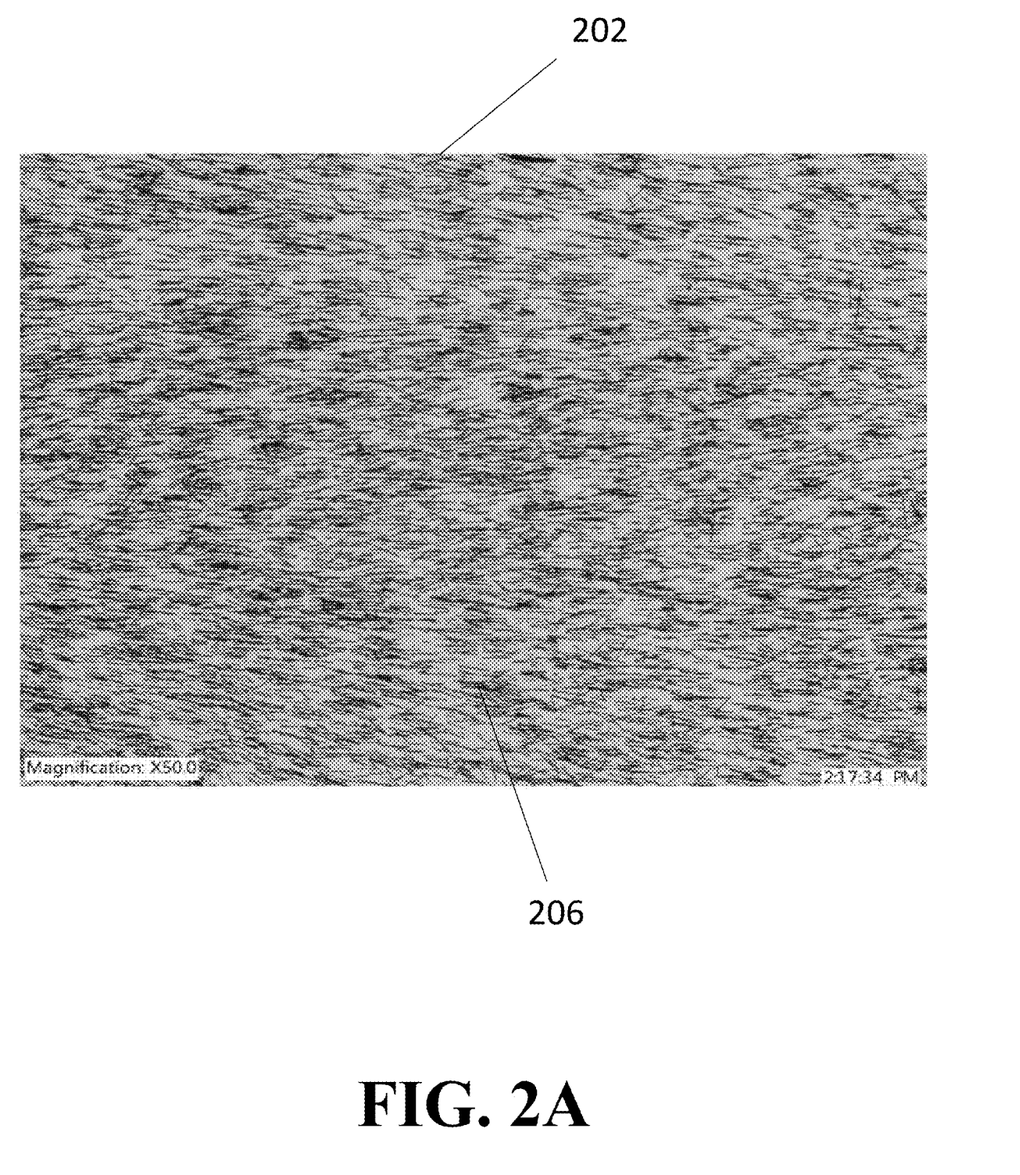
FIGS. 2A-B are cross-sectional views of a thermally conductive material comprising EVA polymer and 8% by weight graphite fiber (FIG. 2A) and a thermally conductive material comprising EVA polymer and 12% by weight graphite fiber (FIG. 2B), each according to at least one embodiment of the present invention.
Figure 2B:
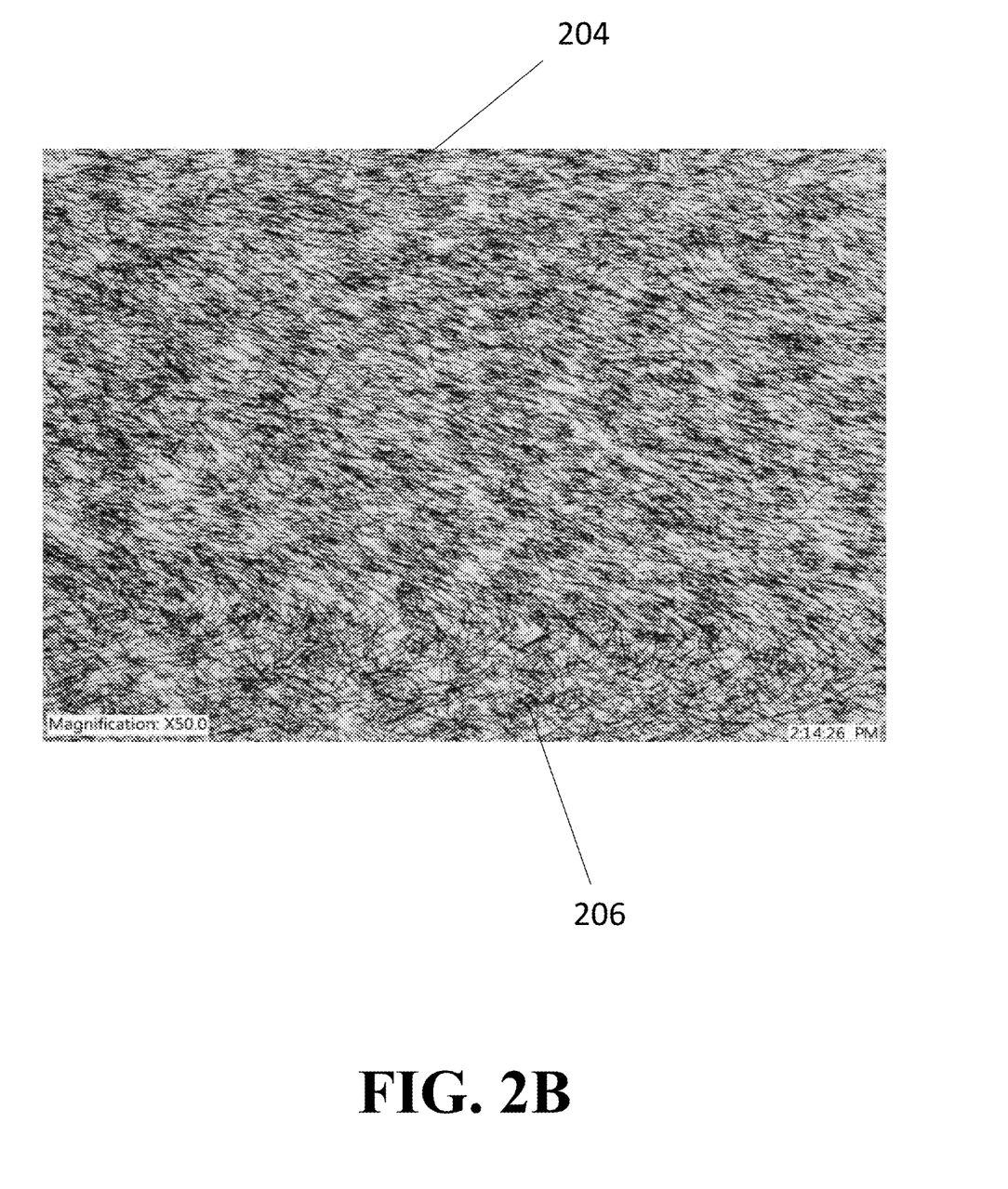

In at least one embodiment of the invention, a combination of EVA polymer (as the base polymer) and graphite fibers (as the additive) is used to produce thermally conductive material. FIG. 2 displays a microscopic view of two such formulations. The first formulation 202 contains 8% by weight graphite fibers (FIG. 2A) and the second formulation 204 contains 12% by weight graphite fibers (FIG. 2B). The graphite fibers 206 can clearly be seen in both formulations, and one of skill in the art will appreciate that the uniform distribution of such fibers is important for isotropic thermal and mechanical properties, such as, for example, hardness and thermal conductivity, both important properties in choosing a formulation for the thermally conductive material. A skilled artisan will recognize a uniform distribution, such as the one shown, from a non-uniform distribution, which presents as distinct dark regions that have a high density of fibers.

It should further be appreciated that a different percentage by weight of graphite fibers may be used in combination with EVA polymer to create a range of thermally conductive materials with different properties. Purely as non-limiting examples, the percent by weight of graphite fibers may range from 8% up to 40%.

Table 3 below shows the hardness of various thermally conductive materials that were produced using a combination of EVA polymer and different percentages of graphite fibers. As can be seen below, the hardness of each of the thermally conductive materials listed is compared to EVA polymer by itself. The hardnesses shown in Table 3 were measured using a durometer (Shore A, IAW ASTM D2240). It should be appreciated that, in addition to hardness, other physical properties can be tested using methods well-known in the art, such as ASTM D638 for mechanical properties.

TABLE 3

Measured hardness data for various thermally conductive materials containing EVA polymer and graphite fiber.

| Material | Hardness (Shore A) |
|---|---|
| Ethylene vinyl acetate (EVA) | 63 ± 3 |
| 8 wt % Graphite Fiber + EVA | 65 ± 3 |
| 10 wt % Graphite Fiber + EVA | 68 ± 5 |
| 12 wt % Graphite Fiber + EVA | 70 ± 2 |
| 20 wt % Graphite Fiber + EVA | 75 ± 7 |
| 30 wt % Graphite Fiber + EVA | 78 ± 5 |
| 40 wt % Graphite Fiber + EVA | 81 ± 4 |

As is apparent from Table 3, the thermally conductive materials using EVA with 8% to 12% graphite fiber have hardness measurements most comparable to EVA polymer alone. Higher graphite fiber percentages (20%, 30%, and 40%) show increased hardness in the range of 70-90 Shore A. One of skill in the art will appreciate that the +/− values in Table 3 may refer to the standard deviation of measured values. Thus, when factoring in significant digits, the hardness of the 8% graphite fiber to 40% graphite fiber formulations in the above table may range from 60-90 Shore A. Specifically, the hardness of the 8% and 12% graphite fiber formulations may range from 60-75 Shore A. It should also be appreciated that graphite fiber percentages in between those shown in the above table are possible, and can produce any hardness in the range of 60-90 Shore A.

Figure 3:
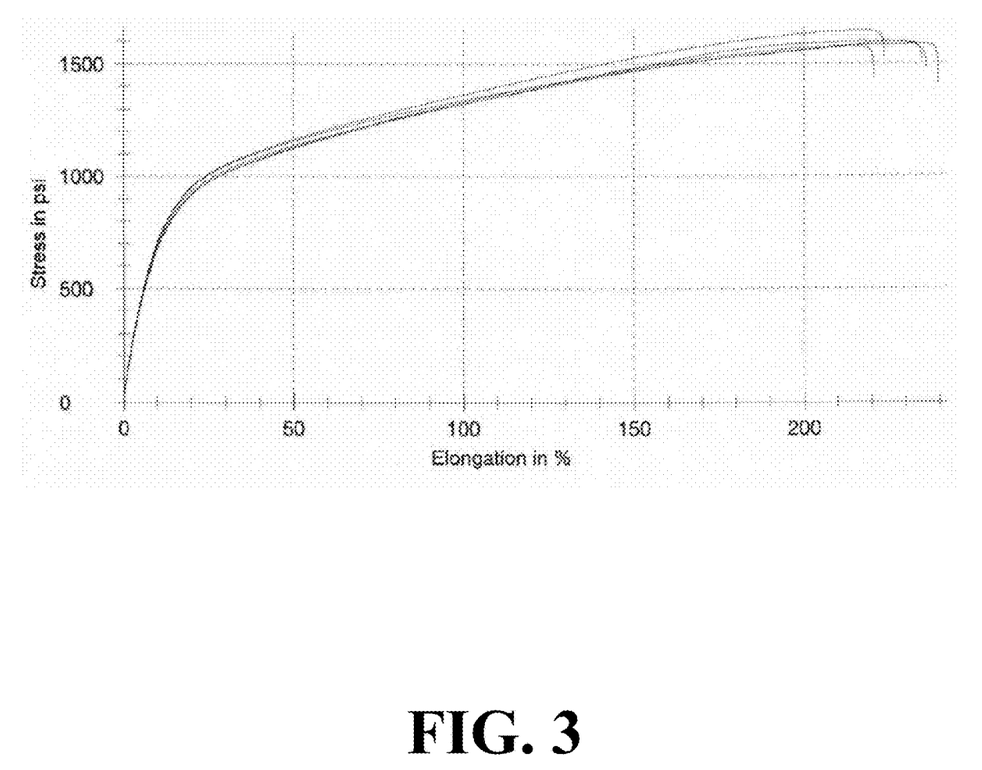
FIG. 3 is a chart illustrating the tensile strength profile of a thermally conductive material comprising EVA polymer and 8% by weight graphite fiber, according to at least one embodiment of the present invention.

Turning now to FIG. 3, a tensile strength profile for different samples of a thermally conductive material comprising EVA polymer and 8% by weight graphite fiber is shown. Each sample performs similarly, with a maximum elongation of more than 200% and a maximum stress level of over 1500 psi.

Further evaluations of (1) a material comprising EVA polymer and 8% by weight graphite fiber and (2) a material comprising EVA polymer and 12% by weight graphite fiber are displayed in Table 4 below. Specifically, the table shows, inter alia, the tensile stress data and break stress data for the aforementioned two materials as compared to EVA polymer by itself

TABLE 4

Mechanical test data for EVA polymer as compared to (1) EVA polymer with 8% by weight graphite fiber and (2) EVA polymer with 12% by weight graphite fiber.

| Sample/Property | Tensile Stress (psi) | Elongation ($\varepsilon_M$, %) | Break Stress (psi) | Elongation ($\varepsilon_B$, %) |
|---|---|---|---|---|
| EVA | 1540 ± 25 | 260 ± 5 | 1470 ± 20 | 260 ± 5 |
| EVA + 8 wt % Graphite Fiber | 1600 ± 27 | 220 ± 8 | 1470 ± 51 | 230 ± 8 |
| EVA + 12 wt % Graphite Fiber | 1630 ± 23 | 200 ± 6 | 1500 ± 20 | 210 ± 8 |

As can be seen from the above table, the combination of EVA polymer with both 8% by weight graphite fiber and 12% by weight graphite fiber results in increased tensile stress and break stress by about 3-6%, as compared to EVA polymer alone. As with Table 3, one of skill in the art will appreciate that the +/− values in Table 4 may refer to the standard deviation of measured values. Thus, when factoring in significant digits, the ranges of, e.g., the 8% graphite fiber formulation may be 1570 to 1630 psi (tensile stress), 210% to 230% elongation ($\varepsilon_M$), 1410 to 1530 psi (break stress), and 220% to 240% elongation ($\varepsilon_B$). Similarly, the ranges of the 12% graphite fiber formulation may be 1600 to 1660 psi (tensile stress), 190% to 210% elongation ($\varepsilon_M$), 1480 to 1520 psi (break stress), and 200% to 220% elongation ($\varepsilon_B$). Again, it should be appreciated that graphite fiber percentages in between 8% and 12% are possible, and can produce values for tensile stress, elongation ($\varepsilon_M$), break stress, and/or elongation ($\varepsilon_B$) that are in between the ranges shown in Table 4.

Figure 4:
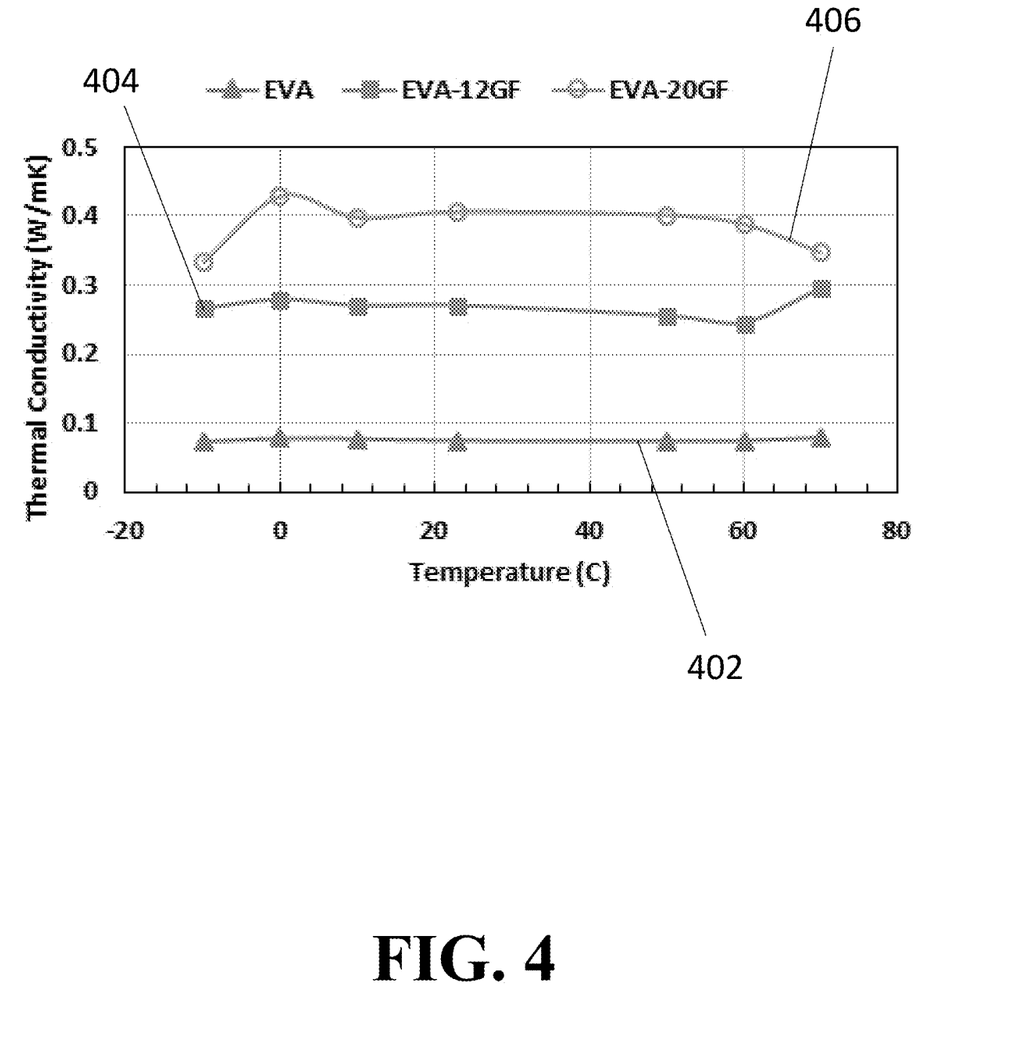
FIG. 4 is a chart illustrating the thermal conductivity at various temperatures of (1) EVA polymer alone, (2) a material comprising EVA polymer and 12% by weight graphite fiber, and (3) a material comprising EVA polymer and 20% by weight graphite fiber, each according to at least one embodiment of the present invention.

Thermal conductivity of the aforementioned, and other, materials can be evaluated using methods and techniques well-known in the art, such as, for instance, the Laser Flash Technique (ASTM E1461 Thermal Diffusivity by the Flash Method). FIG. 4 displays the thermal conductivity of (1) EVA polymer alone (402), (2) a material comprising EVA polymer with 12% by weight graphite fiber (404), and (3) a material comprising EVA polymer with 20% by weight graphite fiber (406).

At all temperatures tested, FIG. 4 shows that the combination of EVA polymer with 12% by weight graphite fiber (404) results in an increase in thermal conductivity from <0.1 W/mK (for EVA polymer alone) to almost 0.3 W/mK (specifically, 0.25 to 0.3 W/mK). Composite material with EVA polymer and 20% by weight graphite fiber (406) exhibits even greater thermal conductivity, in the range of about 0.4 W/mK (specifically, 0.33 to 0.42 W/mK).

Although an increase in the percentage of graphite fiber may result in an increase in thermal conductivity, such an increase also results in increased hardness, as shown in Table 3. An increased hardness may make a thermally conductive material harder to work with, and harder to integrate into thermoregulatory apparel, such as, for instance, a cooling vest.

Therefore, one or more embodiments of the present invention comprise thermally conductive materials that include one or more plasticizers and/or one or more secondary polymers. Many plasticizers and/or secondary polymers are well-known in the art to be non-toxic and approved for proximity to humans, including, for example, for wearable products. These include, as non-limiting examples, EPDM and DEHA. The one or more plasticizers and/or one or more secondary polymers act to decrease the hardness of the thermally conductive material while maintaining, or increasing, its thermal conductivity.

Table 5 sets forth various exemplary formulations that comprise Ethylene Propylene Diene Monomer (EPDM) rubber to reduce hardness and/or Bis(2-ethylhexyl) adipate (DEHA) for improving flexibility. All percentages are by weight.

TABLE 5

Exemplary formulations of various thermally conductive materials developed for improved thermal conductivity and flexibility.

| Material Composition | Hardness (Shore A) | Thermal Conductivity at 23° C. (W/mK) |
|---|---|---|
| 70% EVA, 15% Graphite, 15% DEHA | 76-78 | 0.295 |
| 65% EVA + 5% EPDM, 15% Graphite, 15% DEHA | 70-72 | 0.302 |
| 70% EMA, 15% Graphite, 15% DEHA | 60-62 | 0.342 |

As can be seen from Table 5, the thermally conductive material with EVA and graphite that also comprises EPDM has reduced hardness, but the same or slightly greater thermal conductivity, as compared to a similar material with EVA and graphite that did not have EPDM. Additionally, Table 5 shows that a formulation utilizing EMA (70% EMA, 15% graphite, 15% DEHA) had further reduced hardness but the best thermal conductivity of the three formulations represented.

The addition of DEHA, which is commonly used in plastic products for improving the flexibility of rigid polymers, also helps in reducing hardness. DEHA is the di-ester of 2-ethylhexanol and adipic acid with the formula $(CH_2CH_2CO_2C_8H_{17})_2$. The effect of DEHA on hardness is shown below in Table 6.

TABLE 6

Effect of various percentages of DEHA (by weight) on hardness (Shore A).

| DEHA (wt %) | Hardness (Shore A) |
|---|---|
| 0 | 70 ± 5 |
| 7.5 | 57 ± 3 |
| 15 | 47 ± 5 |
| 30 | 30 ± 5 |
| 40 | 25 ± 5 |

As is apparent from Table 6, an increase in DEHA, up to and including 40% by weight, results in a concomitant and continuing reduction in hardness measurements (Shore A).

Figure 5A:
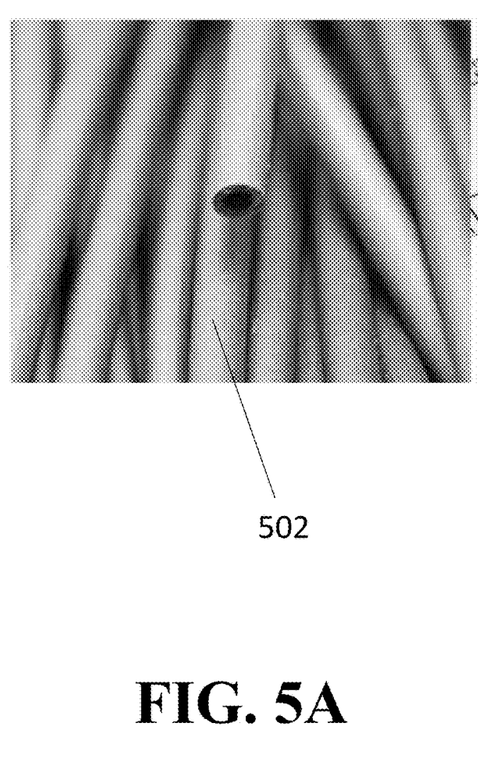
FIGS. 5A-B are depictions of extruded tubes (FIG. 5A) and sheets (FIG. 5B) made from a thermally conductive material comprising EVA polymer and graphite fiber, according to at least one embodiment of the present invention.
Figure 5B:
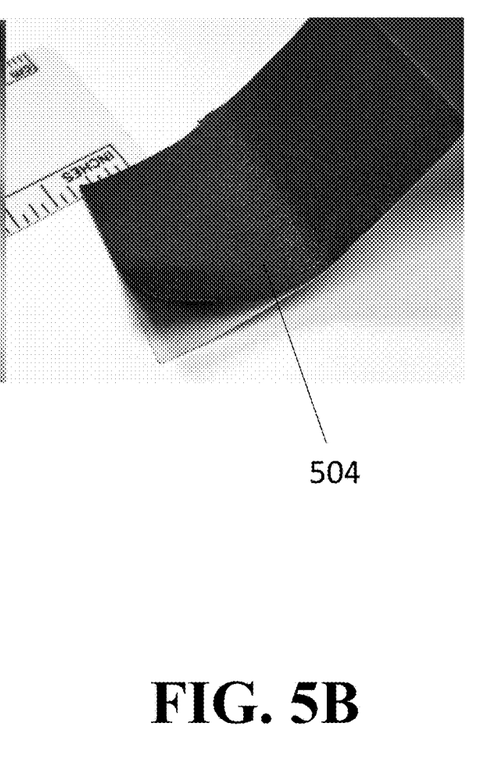

In at least one embodiment of the present invention, the formulations of thermally conductive materials mentioned above, as well as other formulations, were extruded into tubes and/or sheets using one or more methods well-known to those of skill in the art. These formulations included (1) 70% EVA, 15% graphite, and 15% DEHA, and (2) 70% EMA, 15% graphite, and 15% DEHA. The second formulation is preferred for the application of cooling vest tubing based on the combination of hardness and temperature conductivity per Table 5. With particular reference to FIG. 5, tubes 502 and sheets 504 made from a thermally conductive material comprising EVA polymer and graphite fiber are shown. The thermally conductive tubes and/or sheets can then be utilized to create thermoregulatory apparel, including, for example, cooling vests. Purely as a non-limiting example, a plurality of thermally conductive tubes, such as the tubes 502, may be stitched and/or sewn into stretchable fabric, which can then take the shape of various wearable apparel. The use of such thermally conductive tubes enables better heat regulation and cooling for the wearer of the apparel while allowing the wearer freedom of movement.

It should be appreciated that the thermally conductive materials described above herein are an improvement over commercially-available products because, at minimum, the materials described herein provide thermal conductivity that is on par with, or better than, the 0.1-0.2 W/mK provided by commercially-available products, in addition to providing improved flexibility.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A thermally conductive material comprising:
   a base polymer of 70% by weight ethylene methyl acetate (EMA),
   graphite fibers having a concentration by weight of 15%, and
   bis(2-ethylhexyl) adipate (DEHA) having a concentration by weight of 15%.

2. The material of claim 1, wherein the material has a hardness of 60 to 62 Shore A and a thermal conductivity of approximately 0.3 W/mK.

3. The material of 1, wherein the material has a hardness of 60 to 62 Shore A.

4. The material of claim 1, wherein the material has a hardness of 60 to 62 Shore A, and a thermal conductivity of 0.3 W/mK to 0.4 W/mK.

5. The material of claim 1, wherein the material is incorporated into a wearable thermoregulatory system.

6. A thermally conductive tube comprising the thermally conductive material of claim 1.

7. A method of manufacturing a thermally conductive tube, the method comprising:
   extruding the thermally conductive material of claim 1 into a thermally conductive tube.

8. A thermally conductive sheet comprising the thermally conductive material of claim 1.

9. A method of manufacturing a thermally conductive sheet, the method comprising:

extruding the thermally conductive material of claim 1 into a thermally conductive sheet.

10. A thermally conductive material comprising:
one or more base polymers comprising 70% by weight ethylene methyl acetate (EMA);
one or more additives comprising graphite fibers having a concentration by weight of 15%;
a secondary polymer; and
a plasticizer comprising 15% by weight bis(2-ethylhexyl) adipate (DEHA),
wherein the one or more additives and/or the secondary polymer and/or the plasticizer increase thermal conductivity of the thermally conductive material relative to thermal conductivity of the one or more base polymers.

11. The material of claim 10, wherein the one or more base polymers comprises at least one polymer resin matrix.

12. The material of claim 10, wherein the one or more base polymers further comprises a polymer selected from the group consisting of: ethylene vinyl acetate (EVA), Room-Temperature-Vulcanizing (RTV) silicone, and combinations thereof.

13. The material of claim 10, wherein the one or more additives further comprises at least one metallic additive and/or at least one ceramic additive.

14. The material of claim 10, wherein the one or more additives further comprises an additive selected from the group consisting of: boron nitride, zinc oxide (ZnO), multi-walled carbon nanotubes (MWCNT), graphene, and combinations thereof.

15. The material of claim 10, wherein the secondary polymer has a lower hardness than the one or more base polymers.

16. The material of claim 10, wherein the secondary polymer comprises ethylene propylene diene monomer (EPDM).

17. The material of claim 10, wherein the secondary polymer comprises 0% to 5% by weight of ethylene propylene diene monomer (EPDM).

18. A method for producing a thermally conductive material, the method comprising:
combining one or more base polymers with one or more additives, thereby producing a composite material, wherein the one or more additives increases thermal conductivity of the composite material relative to the one or more base polymers; and
adding a secondary polymer and a plasticizer to the composite material, thereby producing the thermally conductive material,
wherein the one or more base polymers comprises 70% by weight ethylene methyl acetate (EMA),
wherein the one or more additives comprises graphite fibers having a concentration by weight of 15%; and
wherein the plasticizer comprises bis(2-ethylhexyl) adipate (DEHA) having a concentration by weight of 15%.

19. The method of claim 18, wherein the combining step is performed using a twin screw-extruder compounding machine.

20. The method of claim 18, wherein the thermally conductive material is incorporated into a plurality of thermally conductive tubes and/or a plurality of thermally conductive sheets.

21. The method of claim 18, wherein the one or more base polymers further comprises a polymer selected from the group consisting of: ethylene vinyl acetate (EVA), Room-Temperature-Vulcanizing (RTV) silicone, and combinations thereof.

22. The method of claim 18, wherein the one or more additives further comprises an additive selected from the group consisting of: boron nitride, zinc oxide (ZnO), multi-walled carbon nanotubes (MWCNT), graphene, and combinations thereof.

23. The method of claim 18, wherein the secondary polymer comprises 0% to 5% by weight of ethylene propylene diene monomer (EPDM).

* * * * *